United States Patent [19]

Kimura et al.

[11] 4,427,869
[45] Jan. 24, 1984

[54] METHOD FOR MANUFACTURING PANEL ASSEMBLIES FOR AUTOMOBILES

[75] Inventors: Toshio Kimura; Kunitoshi Kataoka; Yoshiaki Yamaji; Hiromi Iwasaki; Shinichi Yamashita, all of Hiroshima, Japan

[73] Assignee: Toyo Kogyo Co., Ltd., Hiroshima, Japan

[21] Appl. No.: 428,524

[22] Filed: Sep. 30, 1982

Related U.S. Application Data

[63] Continuation of Ser. No. 221,671, Dec. 1, 1980, abandoned.

[30] Foreign Application Priority Data

Dec. 4, 1979 [JP] Japan ..................... 54-157167

[51] Int. Cl.³ ............................................. B23K 11/00
[52] U.S. Cl. ......................................... 219/93; 219/86.9
[58] Field of Search .................................. 219/93, 86.9

[56] References Cited

U.S. PATENT DOCUMENTS

| | | | |
|---|---|---|---|
| 1,020,056 | 3/1912 | Rietzel | 219/93 |
| 2,021,173 | 11/1935 | Clark | 219/93 X |
| 2,300,700 | 11/1942 | Porter | 219/86.9 |
| 3,004,138 | 10/1961 | Day | 219/93 |
| 4,147,914 | 3/1979 | Body | 219/86.9 |

FOREIGN PATENT DOCUMENTS 504100 4/1939 United Kingdom ............... 219/86.9

Primary Examiner—D. A. Reynolds
Assistant Examiner—Catherine Sigda
Attorney, Agent, or Firm—Fleit, Jacobson, Cohn & Price

[57] ABSTRACT

Method is disclosed for manufacturing a panel assembly comprised of an inner panel and an outer panel which are welded together at the peripheral portions thereof. The method comprises steps of forming a plurality of raised portions having projections in the inner panel along at least one peripheral portion thereof so that the raised portions project in a direction opposite to the outer panel, folding a peripheral portion of the outer panel over the peripheral portion of the inner panel so that the peripheral portion of the outer panel covers the raised portions in the inner panel, applying anvils to the outer panel at portions corresponding to the raised portions and applying welding electrodes to the peripheral portion of the outer panel which is folded over the raised portions of the inner panel so as to depress the peripheral portion of the outer panel to the raised portion simultaneously applying a welding current in series through at least two of the welding electrodes for welding the peripheral portion of the outer panel to the raised portion of the inner panel. The process is effective to prevent thermal deformations and depression marks on the outer panel.

8 Claims, 6 Drawing Figures

METHOD FOR MANUFACTURING PANEL ASSEMBLIES FOR AUTOMOBILES

This is a continuation of application Ser. No. 221,671 filed Dec. 1, 1980, now abandoned.

The present invention relates to method for manufacturing panel assemblies for automobiles and more particularly to forming hemming structures for such panel assemblies.

Conventionally, panel assemblies such as door panels, bonnet lids and trunk lids have an outer and inner panels which are welded together at appropriate portions. Such panel assemblies include hemming structures wherein the outer panel is bent along its periphery over the inner panel and welded thereto along the edge of the outer panel by means, for example, of arc welding. In the conventional structures, the inner and outer panels are subjected to welding heat and permanent deformations are often produced in the panels. Such deformations, if produced in the outer panel, may have serious effects on the appearance of the panel assembly since the outer panel usually has a clear reflective surface after it has been coated by a paint so that even a small deformation may give a bad appearance. Further, the welding heat applied to the outer panel also has an adverse effect on the corrosion resistant property on the panel assembly.

It has therefore been necessary after the arc welding to polish the outer panel so that an improved appearance can be obtained. In order to eliminate such additional work the welding operation may be performed with welding metal which is as small in amount as possible so that the welding heat may be reduced to a satisfactory level. However, such decrease in the amount of the welding metal weakens the strength of the welded portions and there may be produced cracks and separations in the welded portions to thereby decrease the rigidity of the panel assembly. Thus, the welding operation becomes difficult and a high skill is required in performing the arc welding.

In another type of hemming structures in the panel assemblies, the outer panel is bent along its periphery over the inner panel and the superposed edges of the inner and outer panels are curled to secure them together without using a welding technique. In this type of structures, the inner panel is formed with beads or projections which engage with the curled hem portion of the panel assembly to hold the hem portion in position. This type of hemming structures have no problem caused by the welding heat, however, they require a curling operation which is time consuming and moreover has an increased rate of diqualified products. Further, since the curled hem portion is held simply through engagement with the beads or projections formed in the inner panel, an adequate strength cannot be provided in the hem portion of the panel assembly.

In order to eliminate the above problems, the U.S. Pat. No. 4,227,824 proposes to provide the inner panel with a projection along the peripheral portion thereof so that it projects in a direction opposite to the outer panel and to bend the peripheral portion of the outer panel over the projection of the inner panel so that the edge portion of the outer panel is located on the projection and welded thereto by an arc welding technique. The proposed method is advantageous in preventing thermal deformations of the outer panel due to the welding heat, however, there still exist disadvantages inherent to the arc welding technique. For example, it has well been recognized that the arc welding technique is very difficult to apply to an automatic assembling system.

There is another type of hemming structures wherein the peripheral portion of the outer panel is folded over the peripheral portion of the inner panel and connected thereto by a spot welding technique. The spot welding may have less thermal effect than the arc welding but there are still produced a certain amount of thermal deformations. Further, the outer panel is formed with welding traces due to the pressure and heat applied thereto in the spot welding process.

In order to eliminate the above problem, there is proposed by Japanese utility model publication No. 54-16410 published for opposition on June 28, 1979 to provide a layer of heat resistant, electrically insulative material between the outer and inner panels to thereby eliminate any thermal effect on the outer panel. The proposed structure is effective to decrease the thermal effect on the outer panel, however, there are still produced depression marks on the outer panel due to the pressure applied thereto in the spot welding process. Further, a troublesome work must be added for inserting the insulative layer between the outer and inner panels.

It is therefore an object of the present invention to provide a method for welding an outer and inner panels of an automobile panel assembly in which depression marks and thermal effects on the outer panel can effectively be eliminated.

Another object of the present invention is to provide method for manufacturing automobile panel assemblies in which outer and inner panels of the assembly can be welded together with a satisfactory appearance.

A further object of the present invention is to provide a method for welding an outer and inner panels of an automobile panel assembly in which the welding operation can be performed effectively without any additional step.

According to the present invention, the above and other objects can be accomplished by a method for manufacturing a panel assembly comprised of an outer and inner panels, said method comprising steps of forming a plurality of raised portions having projections in the inner panel along at least one peripheral portion thereof so that the raised portions project in a direction opposite to the outer panel, folding a peripheral portion of the outer panel over the peripheral portion of the inner panel so that the peripheral portion of the outer panel covers the raised portions in the inner panel, applying anvils to the outer panels at portions corresponding to the raised portions and applying welding electrodes to the peripheral portion of the outer panel which is folded over the raised portions of the inner panel so as to depress the peripheral portion of the outer panel to the raised portion simultaneously applying a welding current in series through at least two of the welding electrodes for welding the peripheral portion of the outer panel to the raised portion of the inner panel.

According to the features of the present invention, there is provided a heat insulative space between the outer and inner panels by the raised portion of the inner panel so that it is possible to avoid any thermal influence such as a thermal deformation on the outer panel. The raised portions are of a high rigidity so that the pressure applied from the welding electrode to the workpiece can be distributed by the raised portions before the pressure is transmitted to the outer panel. Therefore, it is possible to prevent depression marks on the outer panel. The projections on the raised portion are effective to ensure a reliable quality of welding even with a relatively small welding current and pressure. Thus, the welding heat and the welding pressure can be decreased to the effect that the thermal influence and the depression marks can further be decreased. According to a further feature of the present invention, the welding operation is carried out by passing the electric current in series through at least two of the welding electrodes. This is effective to decrease the current through the outer panel to thereby decrease the thermal deformation and the depression marks on the outer panel.

The above and other objects and features of the present invention will become apparent from the following descriptions of preferred embodiments taking reference to the accompanying drawings, in which.

Figure 1:
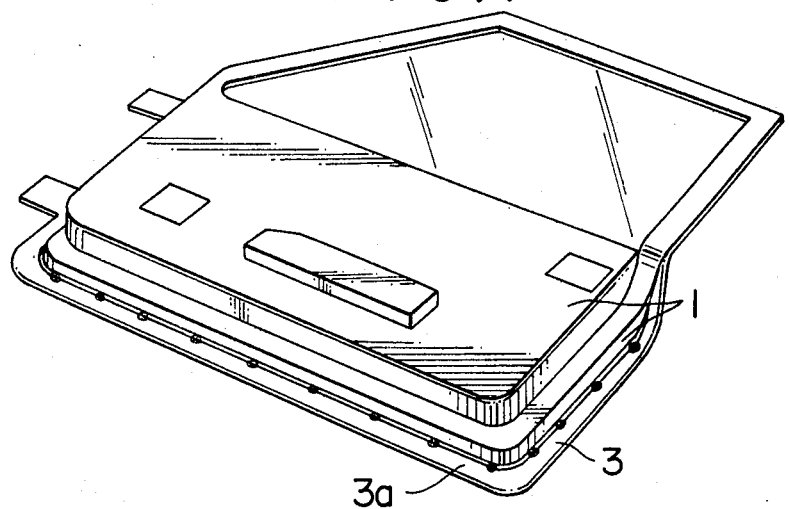
FIG. 1 is a perspective view of an automobile door to which the present invention can be applied.
Figure 4:
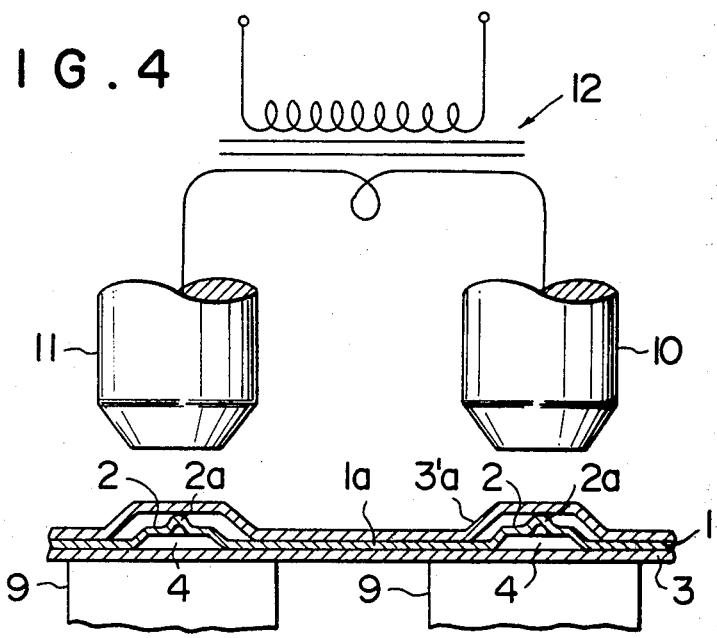
FIGS. 2 through 4 are sectional views showing sequential steps of forming a hemming structure in accordance with the present invention; and, FIGS. 5 and 6 are perspective views showing examples of raised portions which are to be formed on the inner panel.
Figure 5:
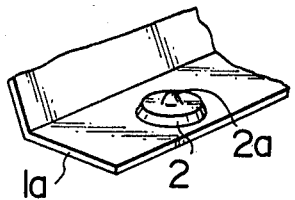
Figure 6:
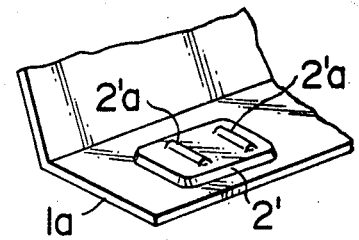
Figure 2:
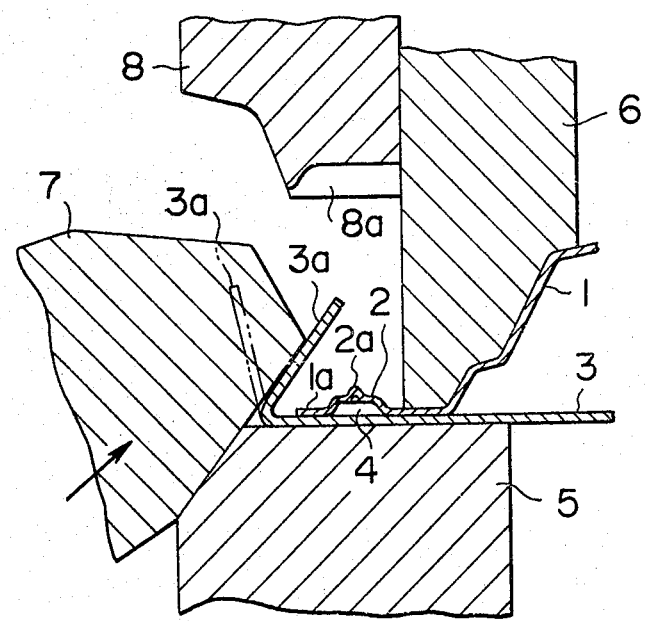
Figure 3:
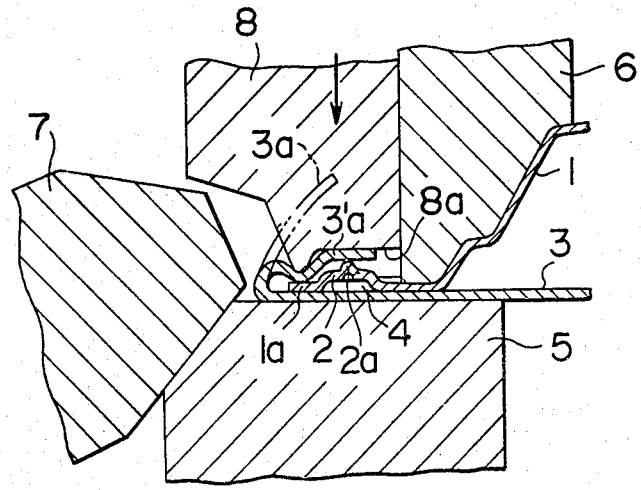

Referring now to the drawings, particularly to FIG. 1, there is shown a door panel assembly comprised of an inner panel 1 and an outer panel 3 which has a peripheral portion 3a folded over the peripheral portion of the inner panel 1 and welded thereto by a spot welding technique. In FIGS. 2 through 4, there are shown sequential steps of forming a hemming structure of the panel assembly. Referring to FIG. 2, it will be noted that the inner panel is formed in a preceding process with a plurality of raised portions 2 along the peripheral portion 1a. The raised portion 2 may be of a circular configuration as shown in FIG. 5 and formed with a projection 2a. Alternatively, the raised portion may be of a non-circular configuration as shown by 2' in FIG. 6 and it may have two or more projections 2a' which may be in the form of ridges. The raised portions 2 or 2' may be formed in the process of press forming step of the inner panel 1 so that no additional step is required for forming the raised portions. It is recommendable that the raised portion 2 be of such configuration that they possess sufficient rigidity to withstand the pressure which may be applied thereto by welding electrodes.

The inner panel 1 is superposed on the outer panel 3 with a space 4 between each raised portion 2 and the outer panel 3 and the superposed panels are placed on a die 5. A presser 6 cooperates with the die 5 to hold the inner panel 1 on the outer panel 3 and a preforming punch 7 is actuated to fold the peripheral portion 3a of the outer panel 3 as shown in FIG. 2. Thereafter, a forming punch 8 is actuated to fold the peripheral portion 3a of the outer panel 3 over the peripheral portion 1a of the inner panel 1 as shown by 3a' in FIG. 3. The forming punch 8 is formed with recessed portion 8a in positions corresponding to the raised portions 2 so that the peripheral portion 3a of the outer panel 3 is laid over the peripheral portion 1a of the inner panel 1 without crashing the raised portions 2.

The superposed panels are then placed on anvils 9 with the outer panel 3 facing to the anvils 9 as shown in FIG. 4. The anvils 9 are located beneath respective raised portions 2 so that they support depressing force which will be applied to the panels by welding electrodes. The illustrated welding apparatus includes paired electrodes 10 and 11 which are connected in series with a secondary winding 12a of a transformer 112 which constitutes a welding power supply. The electrodes 10 and 11 are moved into contact under an appropriate pressure with the peripheral portion 3a of the outer panel 3 which is over the raised portions 2 and a welding current is supplied thereto from the transformer 12 to carry out welding between the peripheral portion 3a of the outer panel 3 and the raised portions 2 of the inner panel 1. In the welding process, the welding current flows for example from one electrode 10 to the portion of the peripheral portion 3a which is in contact with the electrode 10, then through the raised portion 2, the peripheral portion 1a to another raised portion 2 and further through the portion of the peripheral portion 3a which is in contact with the other electrode 11 to the other electrode 11. Thus, there will be substantially no current through the body of the outer panel 3 to the anvils 9 and it is therefore possible to prevent heat generation in the outer panel 3 even under the spot welding process. The spaces 4 formed in the raised portions 2 function to prevent heat transfer from the raised portions 2 to the outer panel 3. The projections 2a on the raised portions 2 are effective to ensure reliable welding quality even with a relatively small welding current and depressing pressure. As the result, it becomes possible to substantially eliminate thermal deformations and depression marks on the outer panel.

EXAMPLE

An outer and inner panels were prepared from SPC mild steel sheet meeting the Japanese Industrial Standard. The outer panel was 0.8 mm thick and coated at the inner surface of the peripheral portion with an anti-corrosion agent. The inner panel was 0.5 mm thick and formed at the peripheral portion with circular raised portions which were 6 mm in diameter and 0.7 mm high. On the top surface of each raised portion, there was formed a projection which was 2 mm in diameter and 0.8 mm high. Spot welding was carried out with the welding current of 5500 to 6000 A, the welding time of 7/60 to 9/60 second, the depressing force of 40 to 60 Kg for each raised portion. It has been observed that the raised portions were buckled but the raised portions were firmly welded to the peripheral portion of the outer panel with a nugget of 3 to 4 mm in diameter. Although the welding current and the depressing force are appreciably low as compared with those in conventional processes, it has been confirmed that a satisfactory quality of welding can be performed. It has further been observed that there was no thermal influences and depression marks on the outer panel. Where the inner and outer panels have zinc plated layer on one of their surfaces, it would be necessary to increase the welding current to for example 6000 to 6500 A. It has further been confirmed that the electrical conductivity of the anvils has no effect on the result.

The invention has thus been shown and described with reference to specific embodiments, however, it should be noted that the invention is in no way limited to the details of the illustrated processes but changes and modifications may be made without departing from the scope of the appended claims.

We claim:

1. Method for manufacturing a panel assembly comprised of outer and inner panels, said method comprising the steps of:

forming the inner panel along at least one peripheral portion thereof with a plurality of raised portions raised in one direction;

forming each of raised portions with at least one projection projecting in said one direction;

placing the inner panel on the outer panel with the raised portions and the projections directed opposite to the outer panel and with a peripheral portion of the outer panel extending beyond the peripheral portion of the inner panel;

folding the peripheral portion of the outer panel over the peripheral portion of the inner panel so that the peripheral portion of the outer panel is laid over the raised portions of the inner panel;

applying anvils to the outer panel at portions corresponding to the raised portions; and applying welding electrodes to the peripheral portion of the outer panel at portions corresponding to the raised portions of the inner panel so as to depress the folded peripheral portion of the outer panel to the raised portion while simultaneously applying welding current in series through at least two of the welding electrodes for welding the folded peripheral portion of the outer panel to the raised portions of the inner panel.

2. Method in accordance with claim 1 in which said raised portions are of substantially circular configuration respectively formed with said projections on top surfaces thereof.

3. Method in accordance with claim 1 in which said raised portions are of non-circular configuration each formed with two projections.

4. Method in accordance with claim 3 in which said projections are in the form of elongated ridges.

5. Method in accordance with claim 1 in which said two of the welding electrodes are supplied with welding current in series by being respectively connected to the opposite ends of a secondary winding of a transformer.

6. Method in accordance with claim 1, wherein the peripheral portion of the outer panel is folded over the peripheral portion of the inner panel in such manner that there is substantially no deformation of said raised portions.

7. Method in accordance with claim 1 or 6, wherein the peripheral portion of the outer panel is folded over the peripheral portion of the inner panel in such manner that a portion of the peripheral portion of the outer panel is forced into contact with a portion of the peripheral portion of the inner panel spaced from said raised portions.

8. Method in accordance with claim 1, wherein the welding electrodes are applied to the peripheral portion of the outer panel in such manner that pressure from the welding electrodes is distributed by the raised portions before being transmitted to the outer panel to thereby prevent depression marks on the outer panel.

* * * * *